United States Patent
Tani (10) Patent No.: US 7,815,198 B2
(45) Date of Patent: Oct. 19, 2010

(54) GASKET

(75) Inventor: Seiji Tani, Saitama (JP)

(73) Assignee: Mahle Filter Systems Japan Corporation, Tokyo (JP)

( * ) Notice: Subject to any disclaimer, the term of this patent is extended or adjusted under 35 U.S.C. 154(b) by 91 days.

(21) Appl. No.: 11/472,373

(22) Filed: Jun. 22, 2006

(65) Prior Publication Data

US 2006/0290075 A1    Dec. 28, 2006

(30) Foreign Application Priority Data

Jun. 24, 2005    (JP) .............................. 2005-184215

(51) Int. Cl.
*F16J 15/02*    (2006.01)
(52) U.S. Cl. .................. 277/644; 277/630; 277/647
(58) Field of Classification Search .................. 277/644, 277/648, 647, 630, 637, 649
See application file for complete search history.

(56) References Cited

U.S. PATENT DOCUMENTS

| | | | | |
|---|---|---|---|---|
| 5,002,290 A | * | 3/1991 | Pernin | 277/649 |
| 5,482,297 A | * | 1/1996 | Burns et al. | 277/644 |
| 5,551,705 A | * | 9/1996 | Chen et al. | 277/648 |
| 5,944,323 A | * | 8/1999 | Cavka | 277/626 |
| 6,065,757 A | * | 5/2000 | Schneider et al. | 277/641 |
| 6,224,058 B1 | | 5/2001 | Drebing et al. | |
| 6,722,660 B2 | * | 4/2004 | Gernand et al. | 277/591 |
| 6,769,698 B2 | * | 8/2004 | Kamiya et al. | 277/614 |
| 6,981,704 B2 | * | 1/2006 | Okazaki et al. | 277/638 |
| 7,306,237 B2 | * | 12/2007 | Tsuji et al. | 277/644 |
| 2006/0208430 A1 | * | 9/2006 | Malz et al. | 277/637 |

FOREIGN PATENT DOCUMENTS

| | | |
|---|---|---|
| DE | 24 47 583 A1 | 4/1976 |
| DE | 197 36 431 A1 | 3/1999 |
| DE | 102 21 150 A1 | 12/2003 |
| JP | 2002-340190 A | 11/2002 |
| JP | 2003-269613 A | 9/2003 |
| JP | 2004-204941 A | 7/2004 |

* cited by examiner

*Primary Examiner*—Alison K Pickard
(74) *Attorney, Agent, or Firm*—Foley & Lardner LLP

(57) ABSTRACT

A gasket is to be disposed in a compressed state between a groove bottom surface defining a gasket groove formed in a first member and a seat surface of a second member so as to make a hermetical sealing between the groove bottom surface and the seal surface. The gasket includes a first seal section formed at an end part of the gasket in a compression direction. The first seal section is ridge-shaped so as to become slender in a direction toward a tip portion of the first seal section. The first seal section has first and second side surfaces which are opposite to each other with respect to a first plane passing through the tip portion of the first seal section. The first side surface overhangs outwardly larger than the second side surface.

4 Claims, 11 Drawing Sheets

GASKET

BACKGROUND OF THE INVENTION

This invention relates to improvements in a gasket for hermetically seal a clearance between two members.

Hitherto a gasket has been extensively used to be installed in a gasket groove formed in one of two members such as a head cover and a cylinder head of an engine in order to hermetically seal a clearance between the two members. Additionally, a so-called low repulsion-type gasket has been recently extensively used in case that a member having the gasket groove is formed of a relatively low rigidity material such as synthetic resin, as disclosed in Japanese Patent Provisional Publication Nos. 2003-269613, 2004-204941 and 2002-340190. The low repulsion-type gasket is arranged to be suppressed lower in repulsion so as to ensure a certain clearance between a side surface defining the gasket groove and a side surface of the gasket by reducing the width of the gasket in an initial state before compression.

In order to prevent such a low repulsion-type gasket from bucking and meandering, an annular projection is formed at the side surface of the gasket so as to project laterally as disclosed in the above Japanese Patent Provisional Publication Nos. 2003-269613 and 2004-204941. Additionally, in order to improve installation safety and assembly operational efficiency, a flat surface portion formed at the side surface of the gasket is brought into contact with the side surface defining the gasket groove, in a state (before compression of the gasket) where the gasket is inserted and set in the gasket groove.

SUMMARY OF THE INVENTION

In case that the above low repulsion-type gasket is symmetrical in a width direction, the gasket will be accidentally curved and buckled in any direction in the width direction, and therefore there is the possibility of occurrence of setting of the gasket and unbalance in contact pressure in the gasket, thereby resulting in lowering in sealing ability of the gasket. If the annular projection is formed as disclosed in Japanese Patent Provisional Publication Nos. 2003-269613 and 2004-204941 in order to prevent the gasket from making such bucking, a repulsion force of the gasket increases thereby providing the fear of degrading the intended low repulsion characteristics of the gasket. Additionally, during insertion of the gasket in the gasket groove, twist in the gasket tends to occur under a sliding resistance between the annular projection and the side surface defining the gasket groove.

In the arrangement in which one side surface of the gasket in a state before compression is brought into contact with the side surface defining the gasket groove as disclosed in Japanese Patent Provisional Publication No. 2002-340190, a high dimensional accuracy is required for the gasket in order to make contact of the gasket with the side surface defining the gasket groove without degradation in assembly operational efficiency and insertion operational efficiency for the gasket. Furthermore, the depth of the gasket groove (or the height of the gasket) is required to increase by an amount corresponding to a longitudinal part of the gasket which part is used for a sealing contact of the gasket in the compression direction, thereby making the gasket large-sized.

In view of the above, an object of the present invention is to provide an improved gasket which can overcome drawbacks encountered in conventional gaskets.

Another object of the present invention is to provide an improved gasket which can stably provide a desired sealing ability even though its structure is very simple.

A further object of the present invention is to provide an improved gasket in which a direction of fall-down of a seal section of the gasket is stably specified to a certain direction (more specifically an outward direction).

An aspect of the present invention resides in a gasket to be disposed in a compressed state between a groove bottom surface defining a gasket groove formed in a first member and a seat surface of a second member so as to make a hermetical sealing between the groove bottom surface and the seal surface. The gasket comprises a first seal section formed at an end part of the gasket in a compression direction. The first seal section is ridge-shaped so as to become slender in a direction toward a tip portion of the first seal section. The first seal section has first and second side surfaces which are opposite to each other with respect to a first plane passing through the tip portion of the first seal section. The first side surface overhangs outwardly larger than the second side surface.

Another aspect of the present invention resides in a gasket to be disposed in a compressed state between a groove bottom surface defining a gasket groove formed in a first member and a seat surface of a second member so as to make a hermetical sealing between the groove bottom surface and the seal surface. The gasket comprises a seal section formed at an end section of the gasket in a compression direction. The seal section is ridge-shaped so as to become slender in a direction toward a tip portion of the seal section. The seal section is deformable to incline in one direction in a width direction of the gasket which direction is perpendicular to the compression direction during compression of the gasket, so that a side surface of the gasket in the one direction is capable of being brought into contact with a side surface defining the gasket groove.

BRIEF DESCRIPTION OF THE DRAWINGS

In the drawings, like reference numerals designate like parts and elements throughout all figures, in which.

DETAILED DESCRIPTION OF THE INVENTION

Hereinafter, embodiments of a gasket according to present invention will be discussed with reference to drawings.

Figure 1:
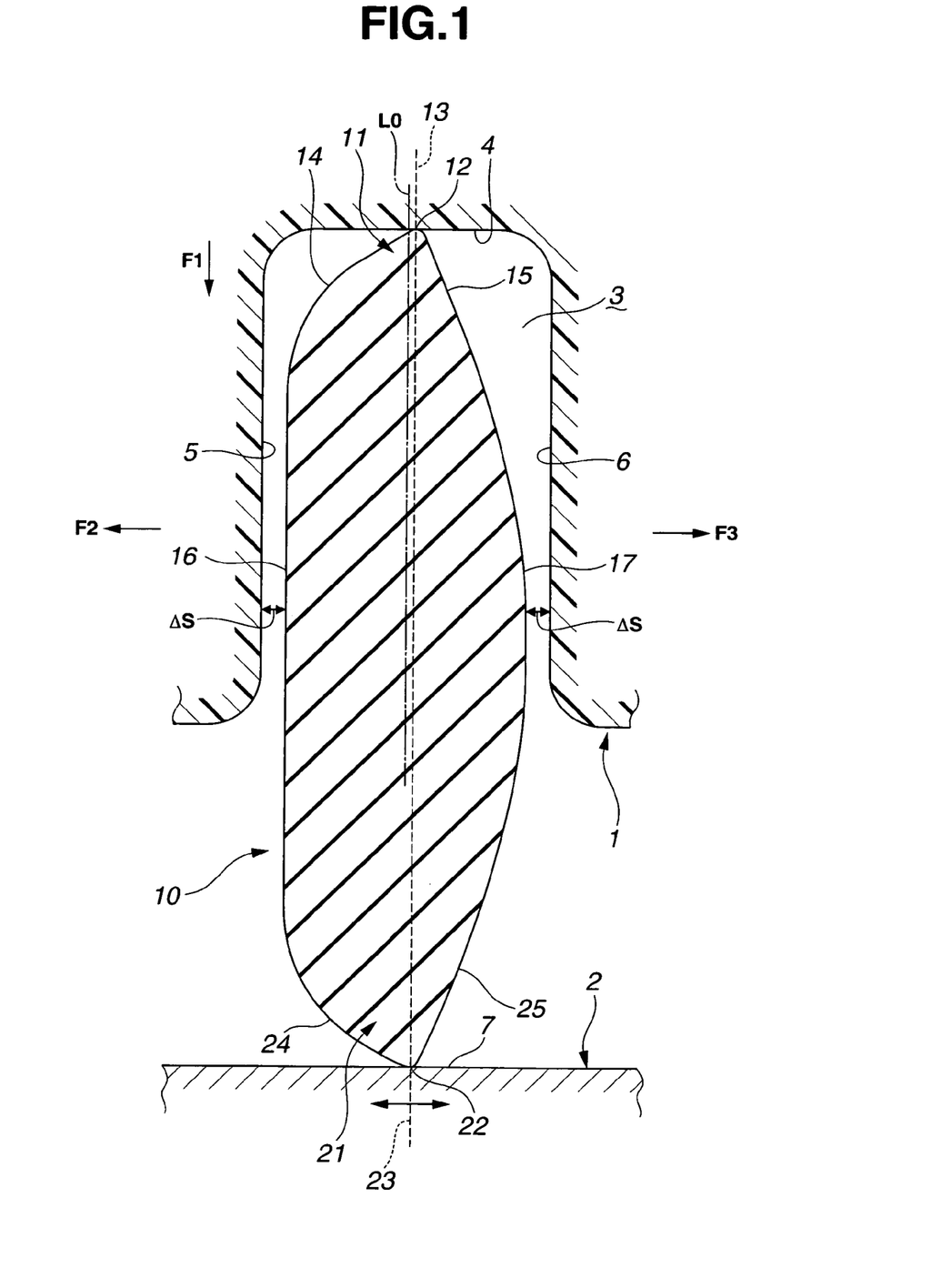
FIG. 1 is a cross-sectional view of a first embodiment of a gasket according to the present invention, showing the gasket in a temporary assembly state.
Figure 2:
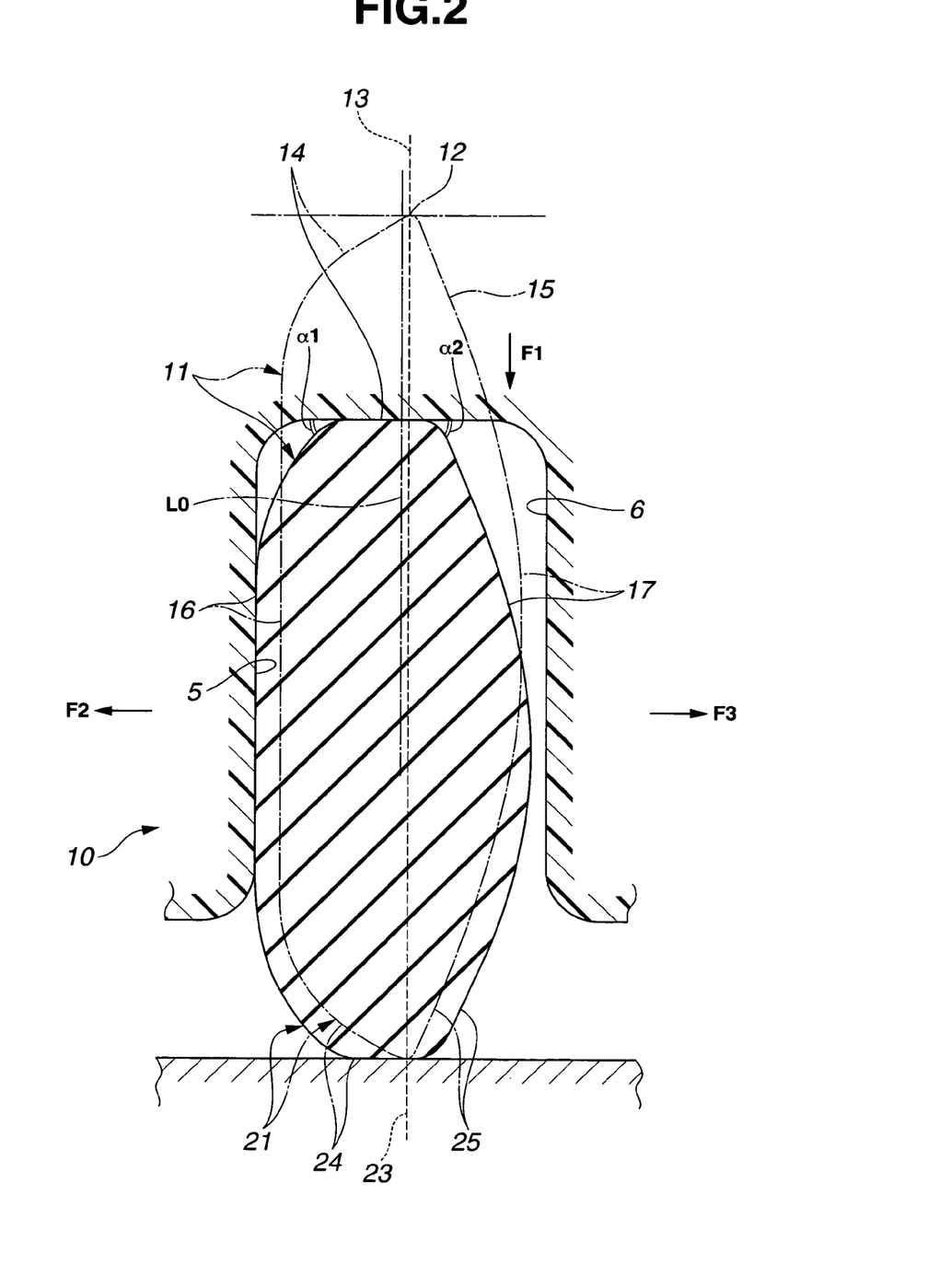
FIG. 2 is a cross-sectional view similar to FIG. 1 but showing the gasket in a compressed and deformed state.

Referring now to FIGS. 1 and 2, a first embodiment of the gasket according to the present invention is illustrated by the reference numeral 10. This gasket 10 is formed of an elastomer such as acrylic rubber or the like which serves as an elastomeric body. The gasket 10 is formed annular as a whole in order to provide a hermetical sealing between the peripheral portions of two members, i.e., a head cover 1 and a cylinder head cover 2, throughout their whole peripheries. The head cover 1 and the cylinder head cover 2 constitute a part of a housing-like structure of an automotive vehicle engine which structure defines therein a hermetically sealed space for oil (lubricating oil). The head cover 1 is formed of plastic or synthetic resin and therefore is lower in rigidity than that formed of metal. The head cover 1 is formed with a gasket groove 3 to which a gasket 10 is inserted and installed, at its bottom peripheral section facing the cylinder head 2. This gasket groove 3 is defined by a groove bottom surface 4 and a pair of groove side surfaces 5, 6 of the bottom peripheral section so as to be channel-shaped. The cylinder head 2 is cast in metal material such as aluminum alloy. In a state where a gasket 10 is installed in the gasket groove 3, the head cover 1 and the cylinder head 2 are approached to each other along a compression direction F1 and fixed, by which the gasket 10 is compressed in the compression direction F1 between the groove bottom surface 4 and a seat surface 7 of the cylinder head 2 which seal surface faces the groove bottom surface 4, so as to deform. Accordingly, the gasket 10 are brought into press and hermetical contact with and hermetically contacted with at least the groove bottom surface 4 and the seat surface 7, so that a clearance between the head cover 1 and the cylinder head 2 is hermetically sealed. The cylinder head cover 1 formed of plastic is fixed in a state of maintaining a clearance between it and cylinder head, thereby taking a floating or semi-floating structure.

FIG. 1 shows a cross-sectional shape of the gasket 10 in a temporary assembly state where the gasket 10 having a natural length and being before compression is inserted and set in the gasket groove 3. In FIG. 1, F3 indicates a housing-like structure inner side or oil side of an engine, engine oil being hermetically sealed within the housing-like structure inner side; and F2 indicates an air side located outside of the engine.

Figure 3:
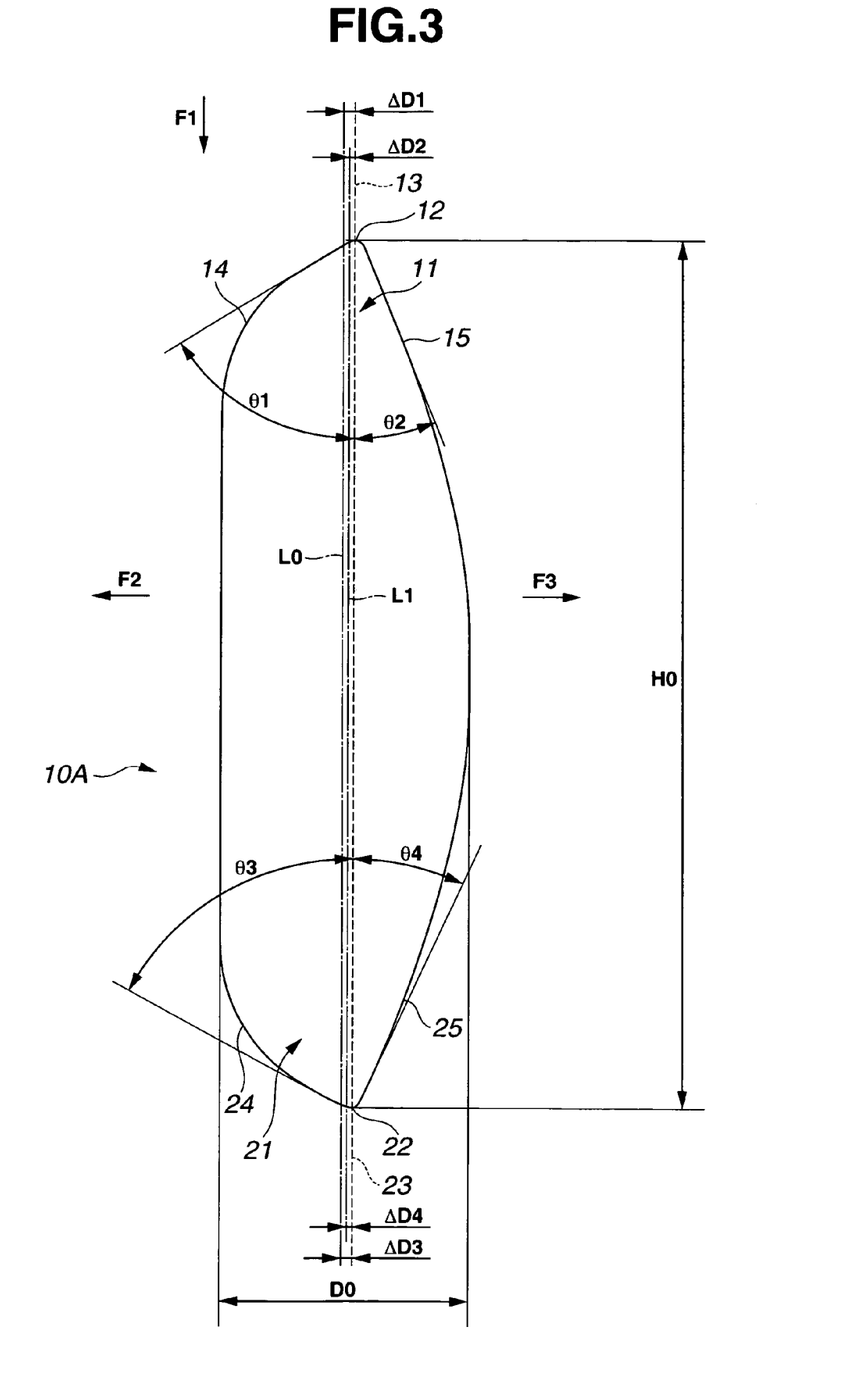
FIG. 3 is a cross-sectional view of the gasket of FIGS. 1 and 2, showing a detailed configuration of the gasket.

The featured shape of the gasket 10 will be discussed with reference to FIG. 3 in addition to FIGS. 1 and 2.

The gasket 10 is elongate in the compression direction F1 and vertically long, and is unsymmetrical in cross-sectional shape in lateral direction or width direction in FIG. 1. The gasket 10 has an overall width D0 (in FIG. 3) smaller than the overall width of the gasket groove 3 and an overall height H0 (in FIG. 3) larger than the overall height of the gasket groove 3. Additionally, a certain clearance ΔS is formed between one of the opposite side surfaces 5, 6 of the gasket groove 3 and the corresponding one of side surfaces 16, 17 of the gasket 10 in the temporary assembly state, so that the gasket is of a low repulsion type.

An upper seal section 11 is formed at the upper end part of the gasket 10 so as to be brought into contact with the groove bottom surface 4. This upper seal section 11 is ridge-shaped so as to become gradually slender toward its peripherally extending upper tip portion 12 which forms a ridgeline. The upper seal section 11 has a first side surface 14 as one side surface and a second side surface 15 as the other side surface, in which the first and second side surfaces 14, 15 are opposite to each other with respect to the upper tip portion 12. The first side surface 14 largely overhangs outwardly as compared with the second side surface 15 so that the first and second side surfaces 14, 15 are unsymmetrical with each other. The first side surface 14 is a side surface at the air side F2 with respect to the upper tip portion 12 in the upper seal section 11, whereas the second side surface 15 is a side surface at the oil side F3 with respect to the upper tip portion 12. In other words, in the upper seal section 11, a section (having the surface 14) located at the air side F2 with respect to an upper seal center plane (line in FIG. 1) 13 is large in volume and thick as compared with a section (having the surface 15) located at the oil side F3 with respect to the upper seal center plane 13. The upper seal center plane 13 vertically extends generally parallel with the side surfaces 5, 6 of the gasket groove 3 and passes through the upper tip portion 12 and a bottom tip portion 22 of the gasket 10.

More specifically, an angle θ1 (indicated in FIG. 3) formed by the first side surface at the air side F2 relative to the upper seal center plane 13 is set larger than an angle θ2 (indicated in FIG. 3) formed by the second side surface 15 at the oil side relative to the upper seal center plane 13, at a region near the upper tip portion 12. Specifically, the angle θ1 formed between the upper seal center plane 13 and the first side surface 14 (or the tangential plane of the first side surface 14) is preferably not less than 45° and more preferably not less than 60°. The angle θ2 formed between the upper seal center plane 13 and the second side surface 15 is preferably half or less the angle θ1, for example, not more than 30°.

Accordingly, in the temporary assembly state shown in FIG. 1, the first side surface 14 gently inclines relative to the groove bottom surface 14 so that the distance thereof from the groove bottom surface 4 is relatively small in a first imaginary vertical plane parallel with the center plane 13, whereas the second side surface 15 steeply inclines so that the distance thereof from the groove bottom surface 4 is relatively large in a second imaginary vertical plane parallel with the center plane 13 and located symmetrical with the first imaginary vertical plane, as shown in FIG. 1.

The upper tip portion 12 actually has a top surface formed curved or chamfered with a certain curvature in section. Each of the first and second side surfaces 14, 15 is formed as an inclined surface or a curved surface formed curved with a suitable curvature, or formed as a combination of the inclined surface and the curved surface. Accordingly, each of the above-mentioned angles θ1, θ2 corresponds to an angle formed by the first or second side surface 14, 15 or a tangent plane (containing a tangent line in section or in FIG. 3) of the surface 14, 15 and the upper seal center plane 13.

Further, in the temporary assembly state, the upper tip portion 12 (or the upper seal center plane 13) is eccentric or offset by ΔD1 to the oil side F3 or the second side surface 15 with respect to a width direction center plane (line in FIG. 3) L0 of the gasket groove 3 and by ΔD2 to the oil side F3 or the second side surface 15 with respect to a width direction center plane (line in FIG. 3) L1 of the gasket 10. Each width direction center plane L0, L1 is generally parallel with the upper seal center plane 13. In other words, the peripheral size and the like of the gasket 10 are so set that the gasket 10 is assembled at a position at which the upper tip portion 12 offsets toward the inner peripheral side of the gasket or to the oil side F3 relative to the groove width direction center plane L0.

A lower seal section 21 is formed at the lower end part of the gasket 10 so as to be brought into contact with a seat surface 7 of the cylinder head 2. This lower seal section 21 also has a first side surface 24 as one side surface and a second side surface 25 as the other side surface, the first and second side surfaces 24, 25 are opposite to each other with respect to the lower tip portion 22. The first side surface 24 largely overhangs outwardly as compared with the second side surface 25 so that the first and second side surfaces 24, 25 are unsymmetrical with each other. The first side surface 24 is a side surface at the air side F2 with respect to the lower tip portion 22 in the lower seal section 21, whereas the second side surface 25 is a side surface at the oil side F3 with respect to the lower tip portion 22. In other words, in the lower seal section 21, a section (having the surface 24) located at the air side F2 with respect to a lower seal center plane (line in FIG. 1) 23 is large in volume and thick as compared with a section (having the surface 25) located at the oil side F3 with respect to the lower seal center plane 23. The lower seal center plane 23 vertically extends generally parallel with the side surfaces 5, 6 of the gasket groove 3 and passes through a bottom tip portion 22 of the gasket 10, so that the lower seal center plane 23 is aligned with the upper seal center plane 13. More specifically, an angle θ3 (indicated in FIG. 3) formed by the first side surface 24 at the air side F2 relative to the lower seal center plane 23 is set larger than an angle θ4 (indicated in FIG. 3) formed by the second side surface 25 at the oil side F3 relative to the lower seal center plane 23, at a region near the lower tip portion 22. Specifically the angle θ3 formed between the lower seal center plane 23 and the first side surface 24 (or the tangential plane of the first side surface 24) is preferably not less than 45° and more preferably not less than 60°. The angle θ4 formed between the lower seal center plane 23 and the second side surface 25 is preferably half or less of the angle θ3, for example, not more than 30°. Accordingly, in the temporary assembly state shown in FIG. 1, the first side surface 24 gently inclines relative to the seat surface 7 so that the distance thereof from the seat surface 7 is relatively small in a third imaginary vertical plane parallel with the lower seal center plane 23, whereas the fourth side surface 25 steeply inclines relative to the seat surface 7 so that the distance thereof from the seat surface 7 is relatively large in a fourth imaginary vertical plane parallel with the center plane 23 and located symmetrical with the third imaginary vertical plane, as shown in FIG. 1.

The lower tip portion 22 actually has a bottom surface formed curved or chamfered with a certain curvature in section. Each of the first and second side surfaces 24, 25 is formed as an inclined surface or a curved surface formed curved with a suitable curvature, or formed as a combination of the inclined surface and the curved surface. Accordingly, each of the above-mentioned angles θ3, θ4 corresponds to an angle formed by the first or second side surface 24, 25 or a tangent plane (containing a tangent line in section or in FIG. 3) of the surface 24, 25 and the lower seal center plane 23. Further, in the temporary assembly state, the lower tip portion 22 (or the lower seal center plane 23) is eccentric or offset by ΔD3 to the oil side F3 or the second side surface 25 with respect to the width direction center plane (line in FIG. 3) L0 of the gasket groove 3 and by ΔD4 to the oil side F3 or the second side surface 25 with respect to the width direction center plane (line in FIG. 3) L1 of the gasket 10. In other words, the peripheral size and the like of the gasket 10 are so set that the gasket 10 is assembled at a position at which the lower tip portion 22 offsets toward the inner peripheral side of the gasket or to the oil side F3 relative to the groove width direction center plane L0.

The first side surfaces 14, 24 of the upper and lower seal section 11, 21 form part of the gasket side surface 16 at the air side F2, whereas the second side surfaces 15, 25 of the upper and lower seal section 11, 21 form part of the gasket side surface 17 at the oil side F3.

With the gasket 10 provided with the above features, when the head cover 1 is assembled on the cylinder head 2, the gasket 10 is compressed in the compression direction F1 so that the upper and lower seal sections 11, 21 elastically deforms in a manner to positively incline toward the air side F2 as shown in FIG. 2. Accordingly, the gasket side surface 16 of the gasket 10 at the air side F2 is preferentially and positively brought into contact with the side surface 5 of the gasket groove 3 at the air side F2.

At this time, in the upper seal section 11, the first side surface 14 is brought into close contact with the groove bottom surface 4 throughout a wide range extending over the width direction center plane L0. By this, a stable sealing ability can be obtained regardless of unevenness at the surfaces 14, 4 or foreign matters such as hair, fibers of cotton glove and/or the like put between the surfaces 14, 4. Additionally, as shown in FIG. 2, at the air side F2, a contact angle α1 formed between the first side surface 14 and the groove bottom surface 4 is very small, so that the first side surface 14 is positively attracted to the groove bottom surface 4 under a pressure differential (vacuum) between the inside and outside of the head cover 1. This increases a contact area of the gasket 10 to the groove bottom surface 4, thereby improving a self-sealing ability of the gasket 10. In contrast, at the oil side F3, the second side surface 15 is brought into contact with the groove bottom surface 4 at a relatively large angle α2, a seal surface pressure is locally increased, thereby securely preventing oil from leaking from the oil side F3 to the air side F2. In the lower seal section 21, the almost same effects as those in the upper seal section 11 can be obtained.

In such a gasket 10 of this embodiment, the gasket 10 is so shaped that the upper and lower seal sections 11, 21 are positively deformed to incline in a certain direction or to the air side F2 during compression of the gasket 10. This can provide a stable sealing ability, reducing and canceling a repulsion force and concentration of an internal stress in the gasket 10. By thus lowering the repulsion force of the gasket 10, the rigidity of the side of the head cover 1 formed of plastic can be lowered, thereby achieving to make the flange section of the head cover 1 thin and light in weight. Additionally, in a sealing structure using the gasket 10, a sealing is accomplished at only one position in the upper or lower seal section 11, 21. This makes it possible to small-size the sealing structure, for example, to reduce the width of the seat surface 7, and to improve a freedom in layout around the seal structure while increasing a contact pressure output in the seal structure. Further, the concentration of the internal stress can be reduced and canceled as mentioned above, and therefore a local excessive distortion can be prevented from occurring in the gasket so as to improve durability and reliability of the gasket 10 thereby obtaining a stable sealing ability for a long time. Furthermore, in the temporary assembly state as shown in FIG. 1, the clearance ΔS is formed between the gasket side surface 16, 17 and the side surface 5, 6 of the gasket groove 3, and therefore the gasket 10 is excellent in operational efficiency for inserting it into the gasket groove 3.

Hereinafter, further embodiments of the gasket according to the present invention will be discussed. These embodiments are similar to the first embodiment, in which the same reference numerals as those in the above embodiment designate the substantially same elements and parts.

Figure 4:
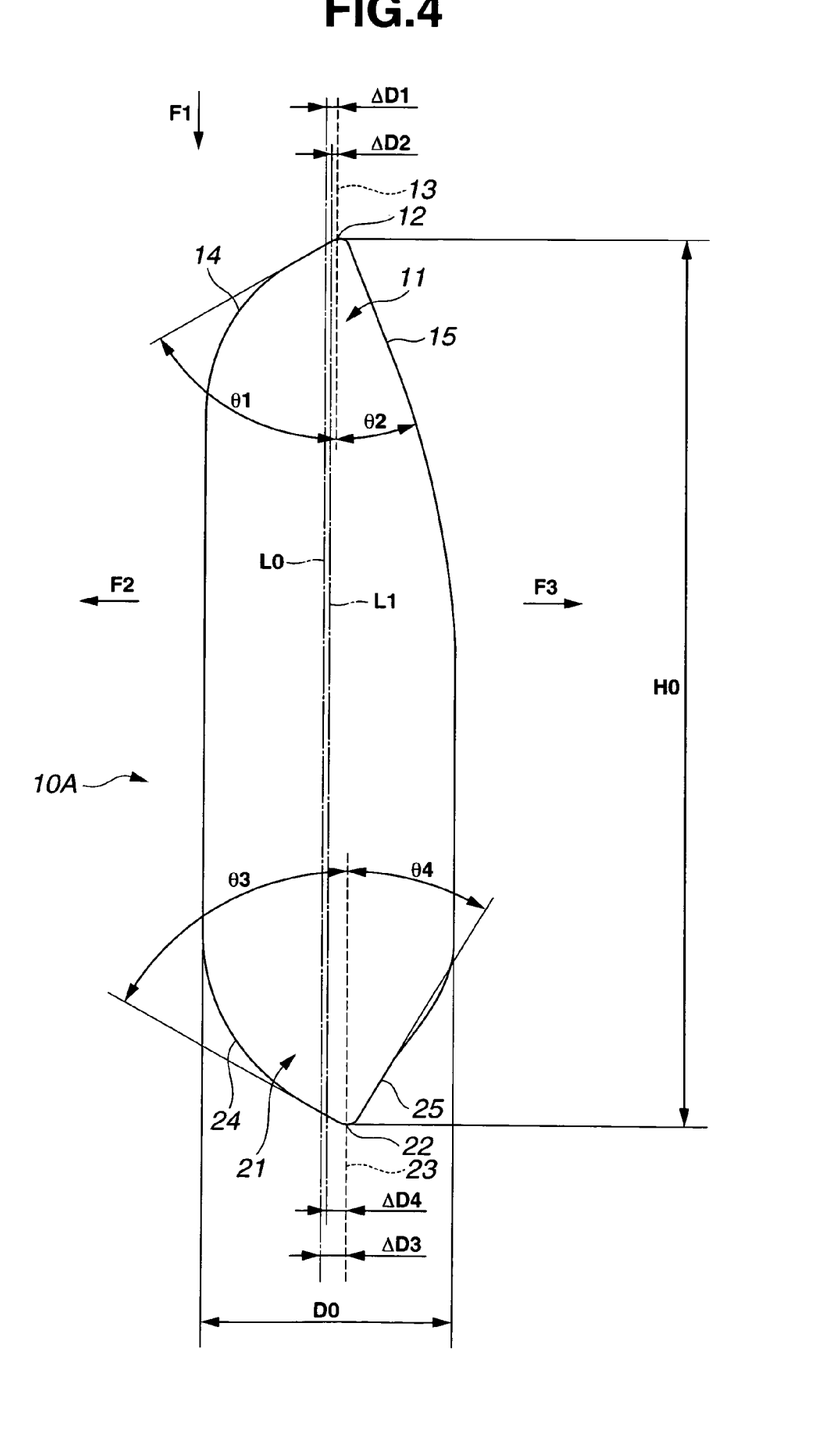
FIG. 4 is a cross-sectional view of a second embodiment of the gasket according to the present invention, showing a detailed configuration of the gasket.

FIG. 4 illustrates a second embodiment of the gasket 10A according to the present invention in section. Although the gasket 10A of the second embodiment is different from that of the second embodiment in such a feature that the upper seal center plane 13 and the lower seal center plane 23 are offset from each other, it is basically the same as that of the first embodiment. The featured shape of the gasket according to this embodiment will be discussed more specifically. Concerning the upper seal section 11, the first side surface 14 is preferably formed as a curved surface having a suitable radius of curvature in order that the first side surface 14 is effectively and widely brought into contact with the groove bottom surface 4 under an elastic deformation of the upper seal section 11 due to compression of the gasket 10A. The angle θ1 formed between the upper seal center plane 13 and the first side surface 14 (or the tangential plane of the first side surface 14) is preferably not less than 45° and more preferably not less than 60°. The angle θ2 formed between the upper seal center plane 13 and the second side surface 15 is preferably half or less of the angle θ1, for example, not more than 30°. Similarly in the lower seal section 21, the angle θ3 formed between the lower seal center plane 23 and the first side surface 24 (or the tangential plane of the first side surface 24) is preferably not less than 45° and more preferably not less than 60°. The angle θ4 formed between the lower seal center plane 23 and the second side surface 25 is preferably half or less of the angle θ3, for example, not more than 30°.

Figure 5:
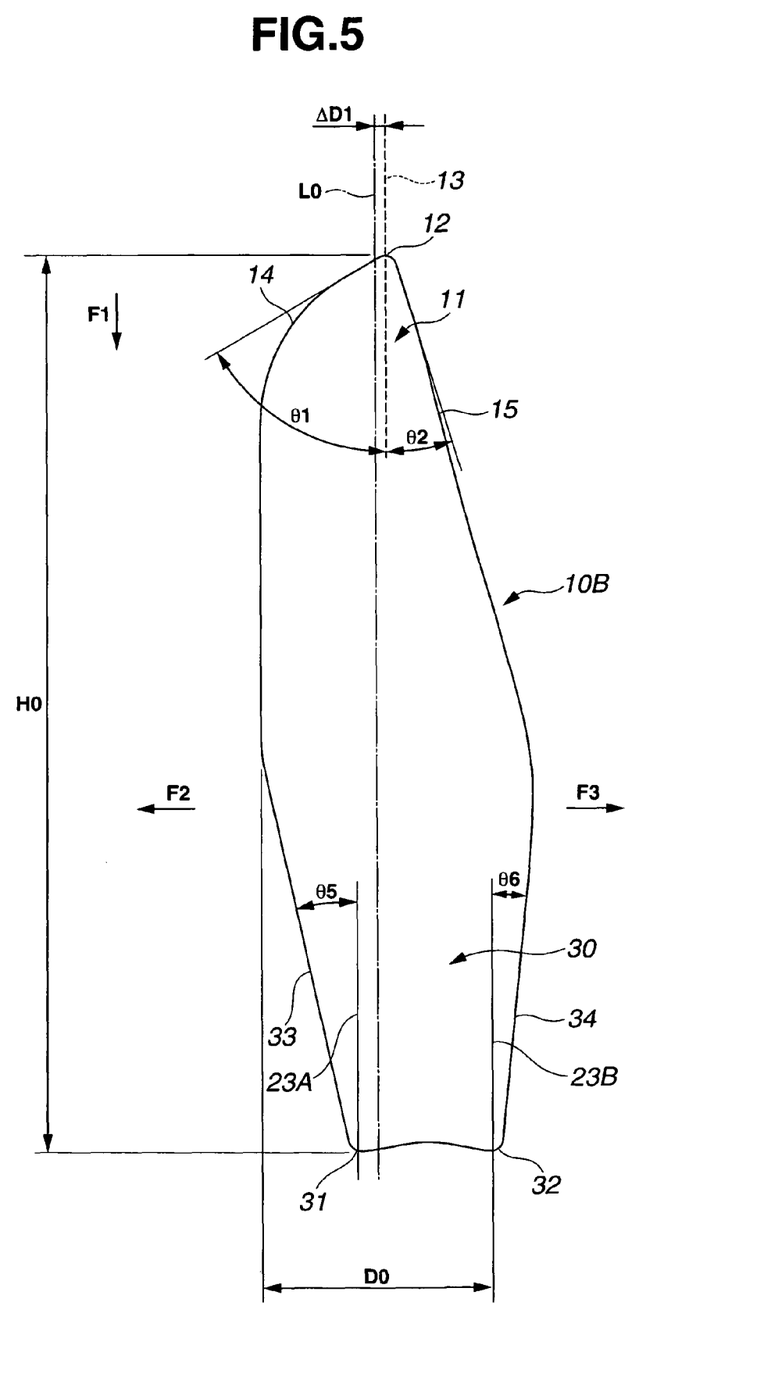
FIG. 5 is a cross-sectional view of a third embodiment of the gasket according to the present invention, showing a detailed configuration of the gasket.

FIG. 5 illustrates a third embodiment of the gasket 10B according to the present invention in section. In this third embodiment, the gasket 10B has a gasket lower section 30 which is generally rectangular in section and is provided with a first lower seal section 31 at the air side F2 and a second lower seal section 32 at the oil side F3 which serve as the lower seal section to be contacted with the seat surface 7 of the cylinder head 2. In other words, this gasket 10B is provided with one upper seal section 11 and two lower seal sections 31, 32, thereby taking a stable sealing and supporting structure of the three point support type in a vertical direction. The gasket lower section 30 is largely offset to the oil side F3 with respect to the width direction center plane L0 (and L1) so that a part (including the section 32) at the oil side F3 is large in volume and thick as compared with an opposite part (including the section 31). Additionally, in the gasket lower section 30 as shown in FIG. 5, an angle θ5 formed between the side surface 33 at the air side F2 and a first lower seal center plane (line in FIG. 4) 23A which passes the tip portion of the first lower seal section 31 and is parallel with the compression direction F1 or the plane L0 is set larger than an angle θ6 formed between the side surface 34 at the oil side F3 and a second lower seal center plane (indicated as a line 23B in FIG. 11) which passes the tip portion of the second lower seal section 32 and is parallel with the compression direction F1 or the plane L0.

With such a shape of the third embodiment, the gasket lower section 30 is so elastically deformed as to incline to the oil side F3 during its compression, so that the side surface 34 at the oil side F3 is preferentially and positively brought into contact with the side surface 6 of the gasket groove 3. In other words, the upper section 11 of this gasket 10B is preferentially brought into contact with the groove side surface 5 at the air side F2, whereas the lower section 30 is brought into contact with the groove side surface 6 at the oil side F3, so that the gasket 10B is set to elastically deform in so-called S-shape. Thus, in this embodiment, inclination and buckling directions of the gasket during elastic deformation are specified, thereby ensuring a desired sealing ability with a simple structure while being excellent in operational efficiency, similarly to the first and second embodiments.

Although the present invention has been explained with reference to the concrete embodiments, it will be understood that present invention is not limited to the above embodiments so that the various changes and modifications may be made in the present invention without departing from the sprit and scope of the present invention.

Figure 6:
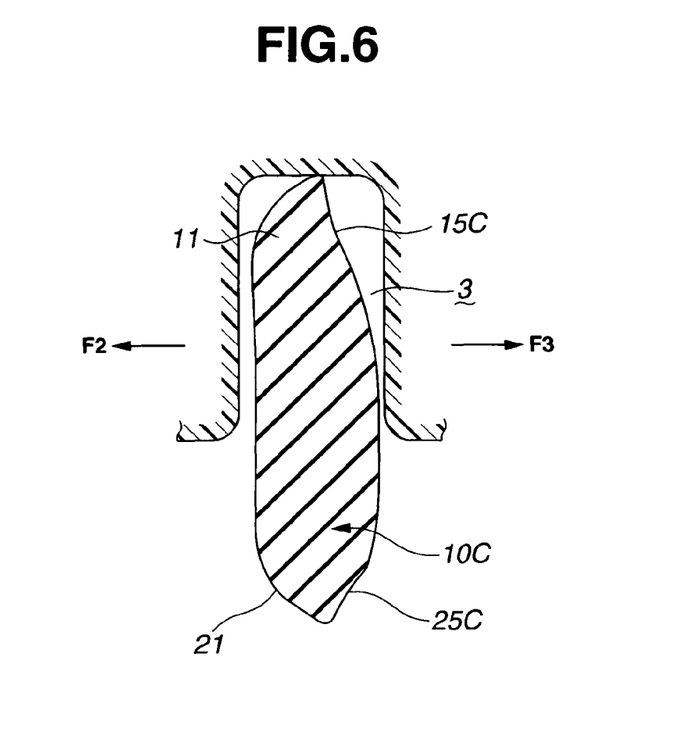
FIG. 6 is a cross-sectional view of a modified example of the gasket according to the present invention, showing the gasket in a temporary assembly state.

For example, the gasket may be formed as that 10C shown in FIG. 6, in which each of the second side surfaces 15C, 25C at the oil side F3 of the upper and lower seal sections 11, 21 is inwardly concave.

Figure 7:
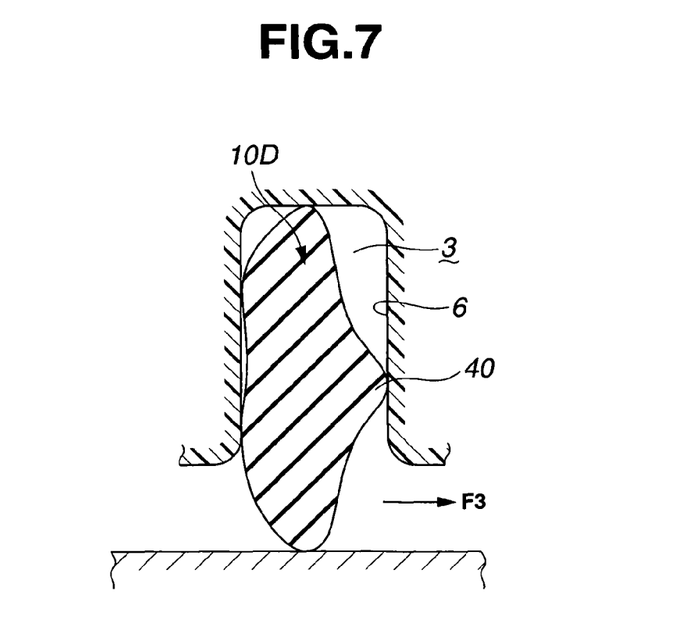
FIG. 7 is a cross-sectional view of another modified example of the gasket according to the present invention, showing the gasket in a temporary assembly state.
Figure 8:
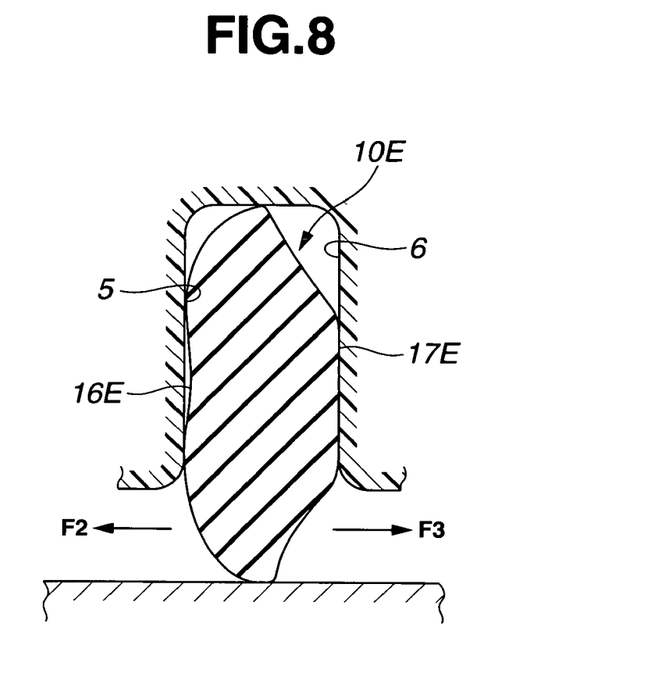
FIG. 8 is a cross-sectional view of a further modified example of the gasket according to the present invention, showing the gasket in a temporary assembly state.
Figure 9:
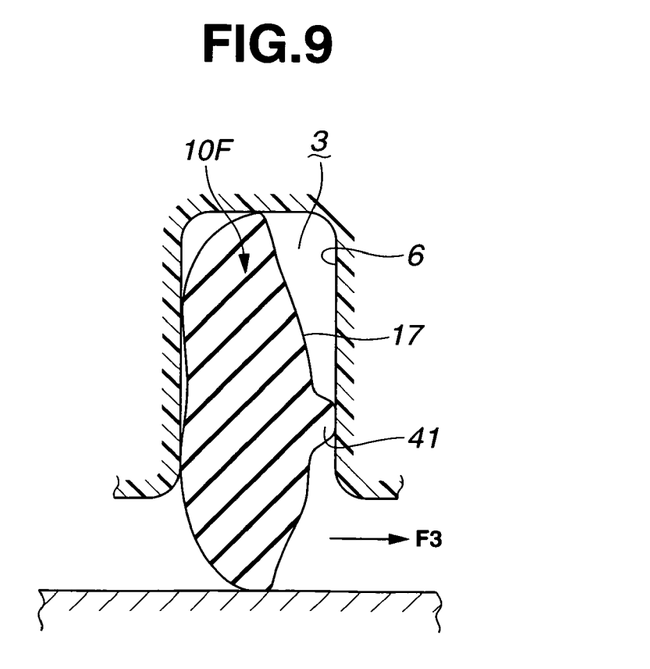
FIG. 9 is a cross-sectional view of a still further modified example of the gasket according to the present invention, showing the gasket in a temporary assembly state.

The gasket may be formed as those 10D, 10E, 10F as respectively shown in FIGS. 7, 8 and 9, which are mainly intended to make a stable assistance to the elastic deformation (or fall-down of the gasket in a certain direction) of the gasket mainly during compression of the gasket and to prevent the gasket from falling off in the temporary assembly state. In this regard, the gasket is arranged such that its central section in a height direction faces and are brought into contact with the opposite side surfaces 5, 6 of the gasket groove 3 substantially without a clearance in the temporary assembly state before compression of the gasket. More specifically, the gasket 10D shown in FIG. 7 is provided with a linear projection 40 formed at its side surface at the oil side F3 and protruded to the oil side F3 so as to be brought into contact with the side surface 6 of the gasket groove 3. This linear projection 40 extends throughout the whole periphery of the gasket to take a band-shape. The gasket 10E shown in FIG. 8 is arranged such that its opposite side surfaces 16E, 17E are respectively brought into contact with the opposite side surfaces 5, 6 of the gasket groove substantially without a clearance. The gasket 10F shown in FIG. 9 is provided with a projection 41 formed at its side surface 17 at the oil side F3 and protruded to the oil side F3 so as to be brought into contact with the side surface 6 of the gasket groove 3. A plurality of the projections 41 are peripherally disposed at intervals of a suitable distance.

Figure 10:
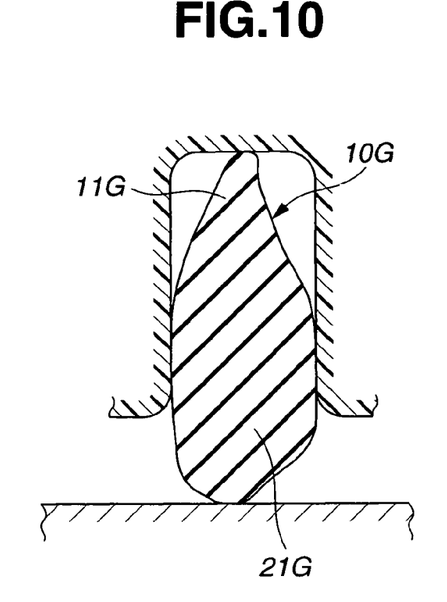
FIG. 10 is a cross-sectional view of a still further modified example of the gasket according to the present invention, showing the gasket in a temporary assembly state.

The gasket 10G shown in FIG. 10 is an example arranged such that the lower seal section 21G at the lower side is larger than the upper seal section 11G, and further sufficiently large as compared with that in the above-discussed embodiments in order to improve a self-standing stability.

Figure 11:
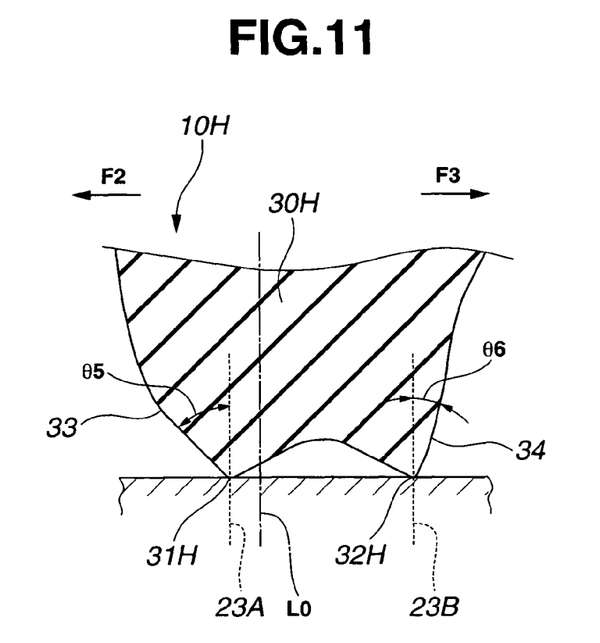
FIG. 11 is a fragmentary cross-sectional view of an essential part of a still further modified example of the gasket according to the present invention, showing the gasket in a temporary assembly state.
Figure 12:
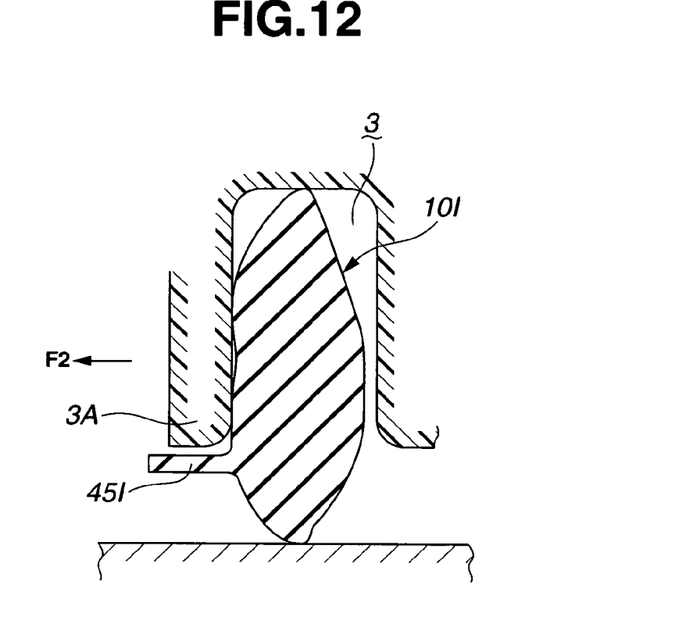
FIG. 12 is a cross-sectional view of a still further modified example of the gasket according to the present invention, showing the gasket in a temporary assembly state.
Figure 13:
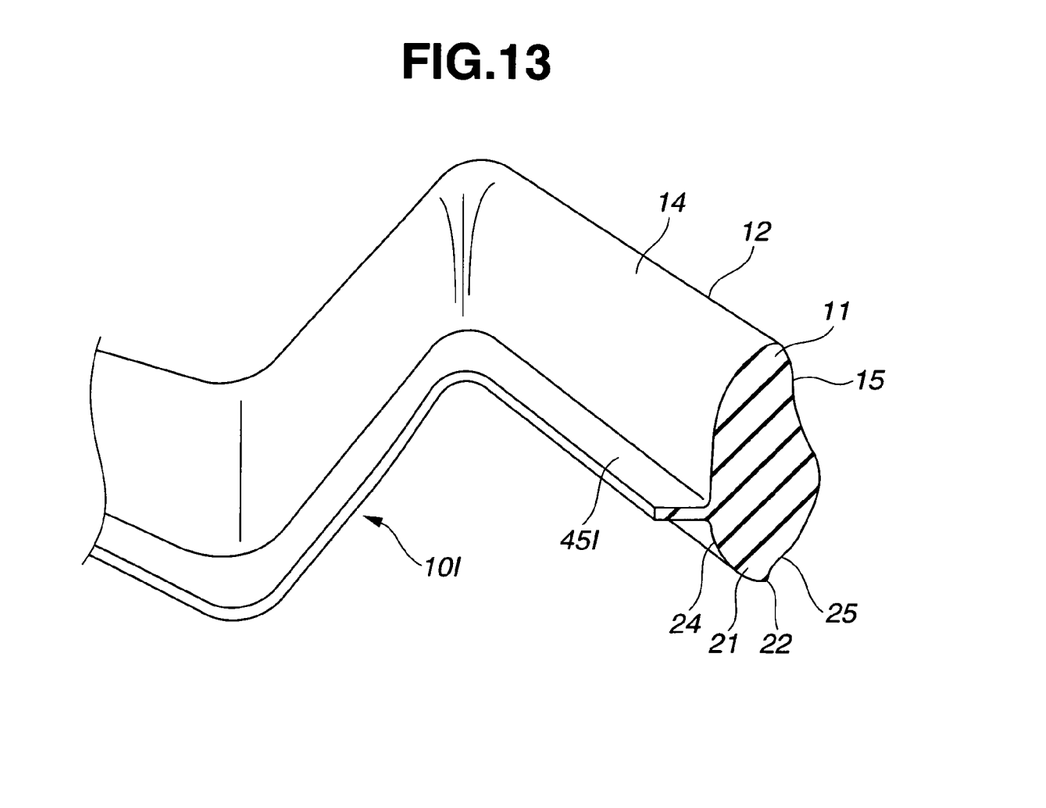
FIG. 13 is a fragmentary perspective view of the gasket of FIG. 12.
Figure 14:
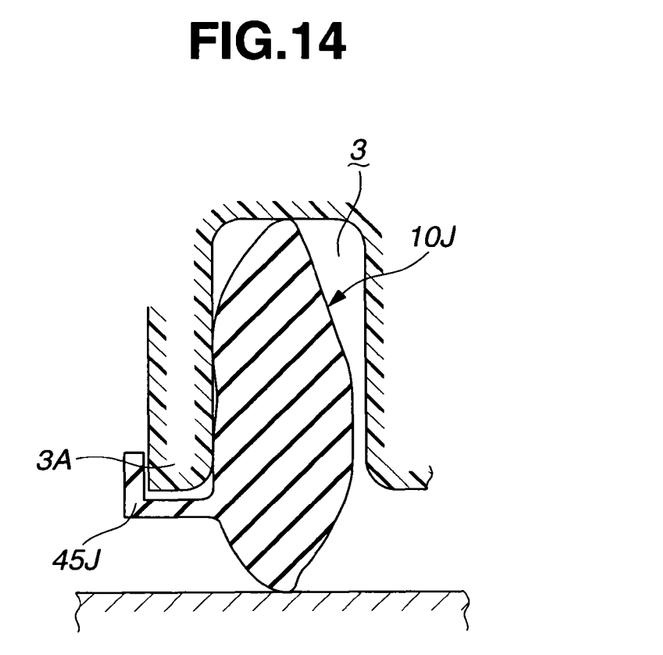
FIG. 14 is a cross-sectional view of a still further modified example of the gasket according to the present invention, showing the gasket in a temporary assembly state.
Figure 15:
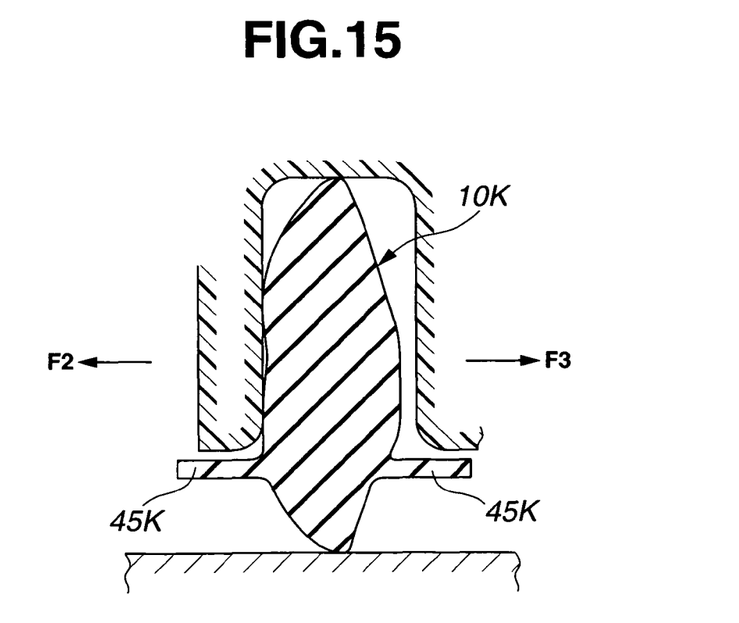
FIG. 15 is a cross-sectional view of a still further modified example of the gasket according to the present invention, showing the gasket in a temporary assembly state.
Figure 16A:
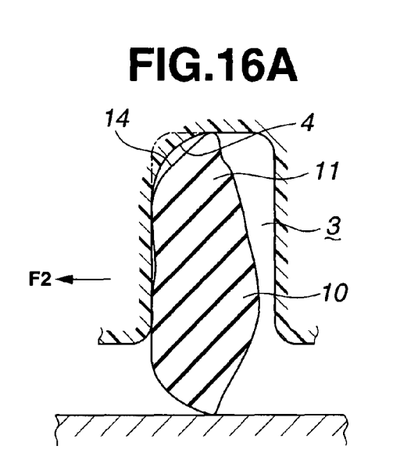
FIG. 16A to 16F show respectively examples of a gasket groove in which the gasket according to the present invention is disposed.
Figure 16B:
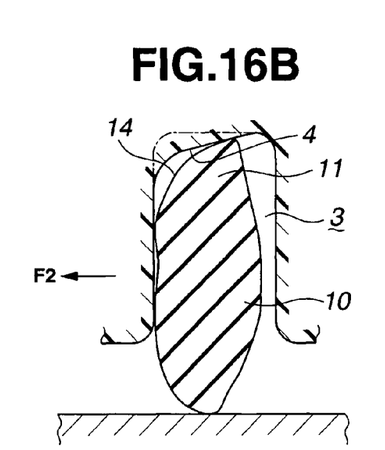
Figure 16C:
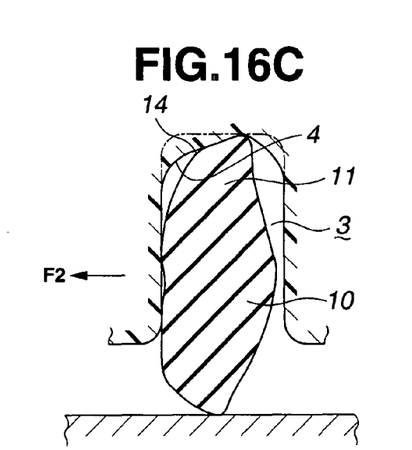
Figure 16D:
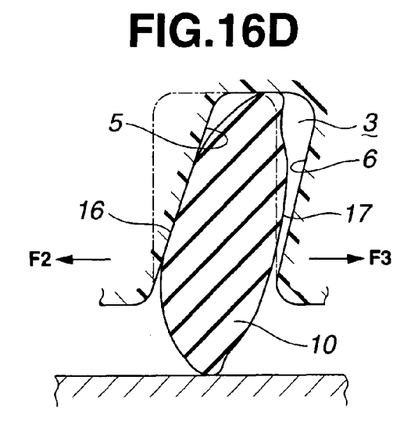
Figure 16E:
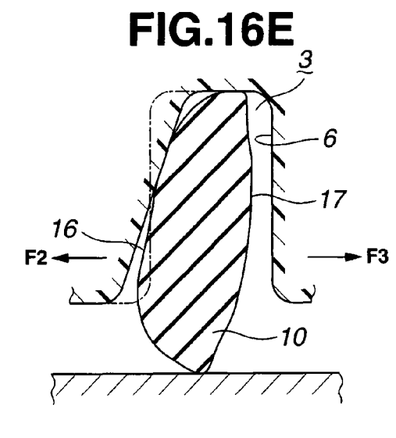
Figure 16F:
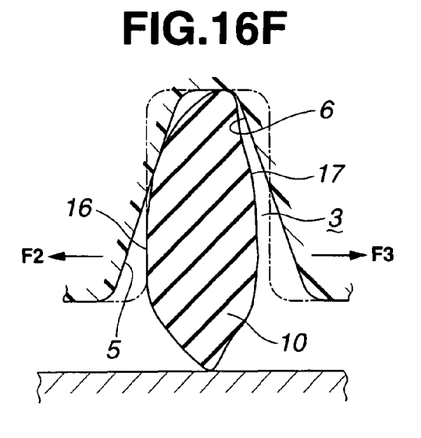

The gasket 10H shown in FIG. 11 is arranged such that its gasket lower section 30H which is generally rectangular in section is provided with the first seal section 31H at the air side F2 and the second seal section 32H at the oil side F3, serving as the lower seal section in contact with the seat surface 7 of the cylinder head 2, similarly to that of the third embodiment. The gasket lower section 30H is largely offset to the oil side F3 with respect to the width direction center plane L0 (and the plane L1), so that a part (including the section 32H) at the oil side F3 is larger in volume than a part (including the section 31H). Additionally, the angle θ5 formed between the side surface 33 at the air side F2 and the first lower seal center plane 23A is set larger than the angle θ6 formed between the side surface 34 at the oil side F3 and the second lower seal center plane 23B.

The gaskets 10I, 10J, 10K shown respectively in FIGS. 12 and 13, FIG. 14 and FIG. 15 are provided with an installation guide projection 45I, 45J, 45K to be guided to an peripheral portion around the gasket groove 3 for the purpose of securing a uniformity of a sealing surface of the gasket and maintaining a shape of the gasket during installation of the gasket to the head cover and for the purpose of improving an operational efficiency during installation of the gasket. Specifically, in the gasket 10I shown in FIGS. 12 and 13, the installation guide projection 45I is integrally formed at the side surface (of the gasket) at the air side F2 in such a manner as to be contactable with an outer peripheral portion 3A around the gasket groove 3. In the gasket 10J shown in FIG. 14, the installation guide projection is integrally formed at the side surface (of the gasket) at the air side F2 and formed generally L-shaped in section so as to be fitted on the outer peripheral portion 3A around the gasket groove 3 from the lower side. In the gasket 10K shown in FIG. 15, the installation guide projections 45K, 45K are formed at the opposite sides (of the gasket) at the air and oil sides F2, F3.

FIGS. 16A to 16F show examples in shape of the gasket groove 3 suitable for the gaskets 10 whose right and left sides with respect to the width direction center plane L1 are unsymmetrical with each other. In the gaskets shown in FIGS. 16A, 16B and 16C, the groove bottom surface 4 of the head cover 1 is formed as an inclined or curved surface which is inclined or curved corresponding to the above-mentioned first side surface 14 of the upper seal section 11 in order that the groove bottom surface 4 can be effectively brought into surface-contact with the first side surface 14 (of the upper seal section 11) at the air side F2 throughout a wide range. In the gaskets shown in FIGS. 16D, 16E and 16F, the side surface 5 (of the gasket groove 3) at the air side F2 is formed as an inclined surface which inclines to the oil side F3 in a direction toward the upper side in order that the side surface 5 (of the gasket groove 3) at the air side F2 can be effectively brought into surface-contact with the gasket side surface 16 at the air side F2. Additionally, in the gaskets shown in FIGS. 16D to 16F, the side surfaces 5, 6 of the gasket groove 3 are formed unsymmetrical with each other in order to stabilize an elastic deformation mode (in a fall-down direction) of the gasket during compression. Particularly in the gaskets shown in FIGS. 16D and 16F, the side surface 6 (of the gasket groove 3) at the oil side F3 is inclined to be along the oil side gasket side surface 17 in order to prevent oil side side surface 6 of the gasket groove 3 from locally strongly contacting (one-side contact) with the oil side gasket side surface 17.

As appreciated from the above, according to the present invention, a direction of fall-down of the seal section of the gasket is stably specified to a certain direction (more specifically a direction toward the first side surface 14, 24 of the seal section), so that the gasket can stably provide a desired sealing ability though it has a simple structure.

The entire contents of Japanese Patent Application No. 2005-184215, filed Jun. 24, 2005, are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A gasket to be disposed in a compressed state between a groove bottom surface defining a gasket groove formed in a first member and a seal surface of a second member so as to make a hermetical sealing between the groove bottom surface and the seal surface, the gasket comprising:

a first seal section formed at an end part of the gasket in a compression direction, the first seal section being ridge-shaped so as to become slender in a direction toward a tip portion of the first seal section, the first seal section having first and second side surfaces which are opposite to each other with respect to a first plane passing through the tip portion of the first seal section, the first side surface overhanging outwardly larger than the second side surface, wherein the tip portion of the first seal section is offset in a direction of the second side surface relative to a width direction center plane of the gasket groove; and a second seal section formed at the other end part of the gasket in the compression direction, the second seal section being ridge-shaped so as to become slender in a direction toward a tip portion of the second seal section, the second seal section having third and fourth side surfaces which are opposite to each other with respect to a fifth plane passing through the tip portion of the second seal section, the third side surface overhanging outwardly larger than the fourth side surface, wherein a third angle formed by the fifth plane and a tangential plane of the third side surface is larger than a fourth angle formed by the fifth plane and a tangential plane of the fourth side surface, the fifth plane being parallel with the width direction center plane of the gasket, wherein the first side surface of the first seal section and the third side surface of the second seal section are connected to each other through an intermediate side surface which is contactable with a groove side surface defining the gasket groove, the intermediate side surface continuously extending throughout a longitudinal length of the gasket such that the intermediate side surface is configured to be in continuous contact with the groove side surface throughout the longitudinal length of the gasket upon compression.

2. A gasket as claimed in claim 1, wherein the second side surface is steeper than the first side surface.

3. A gasket as claimed in claim 1, wherein a first angle formed by the first plane and a tangential plane of the first side surface is larger than a second angle formed by the first plane and a tangential plane of the second side surface, the first plane being parallel with the width direction center plane of the gasket.

4. A gasket as claimed in claim 1, wherein a first distance between the first side surface and a second plane passing through a surface of the tip portion of the first seal section is smaller than a second distance between the second side surface and the second plane, the first distance being on a third plane parallel with the width direction central plane of the gasket, the second distance being on a fourth plane parallel with the width direction center plane of the gasket, the third plane and the fourth plane being symmetrical to each other with respect to the width direction center plane of the gasket.

* * * * *